BLACK LEVEL SETTING CIRCUIT FOR COLOR SUBCARRIER MODULATOR

Filed Sept. 21, 1966

INVENTOR.
PETER HAFERL
BY
W. H. Spouagle
Attorney

April 8, 1969 P. HAFERL 3,437,745

BLACK LEVEL SETTING CIRCUIT FOR COLOR SUBCARRIER MODULATOR

Filed Sept. 21, 1966 Sheet 2 of 4

INVENTOR.
PETER HAFERL
BY
W H Sprague
Attorney

INVENTOR.
PETER HAFERL
BY
W. H. Spowagle
Attorney

Inventor:
PETER HAFERL
By W. H. Spoagle
Attorney

United States Patent Office 3,437,745

Patented Apr. 8, 1969

3,437,745

BLACK LEVEL SETTING CIRCUIT FOR COLOR SUBCARRIER MODULATOR

Peter Haferl, Zurich, Switzerland, assignor to Radio Corporation of America, a corporation of Delaware Filed Sept. 21, 1966, Ser. No. 581,027

Int. Cl. H04n 5/38, 9/32

U.S. Cl. 178—5.4 9 Claims

This invention relates to a video signalling system and particularly to a system for producing a color representative signal suitable for phase-modulating a subcarrier wave.

One of the color television systems which has been proposed, particularly for use in certain European countries, is popularly known as PAL (Phase Alteration Line-by-Line). Such a system is related to the so-called NTSC color television system presently in use in the United States of America. Both systems transmit a full bandwidth luminance signal and two limited bandwidth color difference signals; the latter two signals being amplitude-modulated respectively on quadrature phases of a subcarrier wave having a frequency within the luminance video signal band. As distinct from the NTSC system, in which both color difference signals are continuously transmitted, only one of the color difference subcarrier signals is transmitted continuously without modification in the PAL system and the other color difference signal is transmitted with the subcarrier phase reversed in alternate horizontal line-scanning periods.

One of a number of ways of producing the alternating phase reversal of the other color difference signal-modulated subcarrier wave is to alternately modulate a given phase of the subcarrier wave by opposite polarities of the color difference signal. In such a system, only two quadrature phases of the subcarrier wave are required. There is, however, the requirement that both polarities of the color difference video signal have the same highly stable black level.

An object of the present invention, therefore, is to provide a novel signalling system for producing a video signal of substantially constant black level and alternating in polarity at a given periodicity.

In a signalling system embodying the invention, two video signal gate circuits supplied respectively with opposite polarities of a video signal, are switched alternately at a given periodicity to couple first one and then the other polarity of video signal to an output circuit. One black level setting means is associated with one gate circuit to establish the black level of the first polarity video signal relative to a fixed reference potential. Another black level setting means is associated with the other gate circuit to establish the black level of the other polarity video signal relative to the black level of the first polarity video signal.

For a more detailed disclosure of a system embodying the present invention, reference may be had to the following description which is taken in conjunction with the accompanying drawings, of which:

Figures 1, 2:
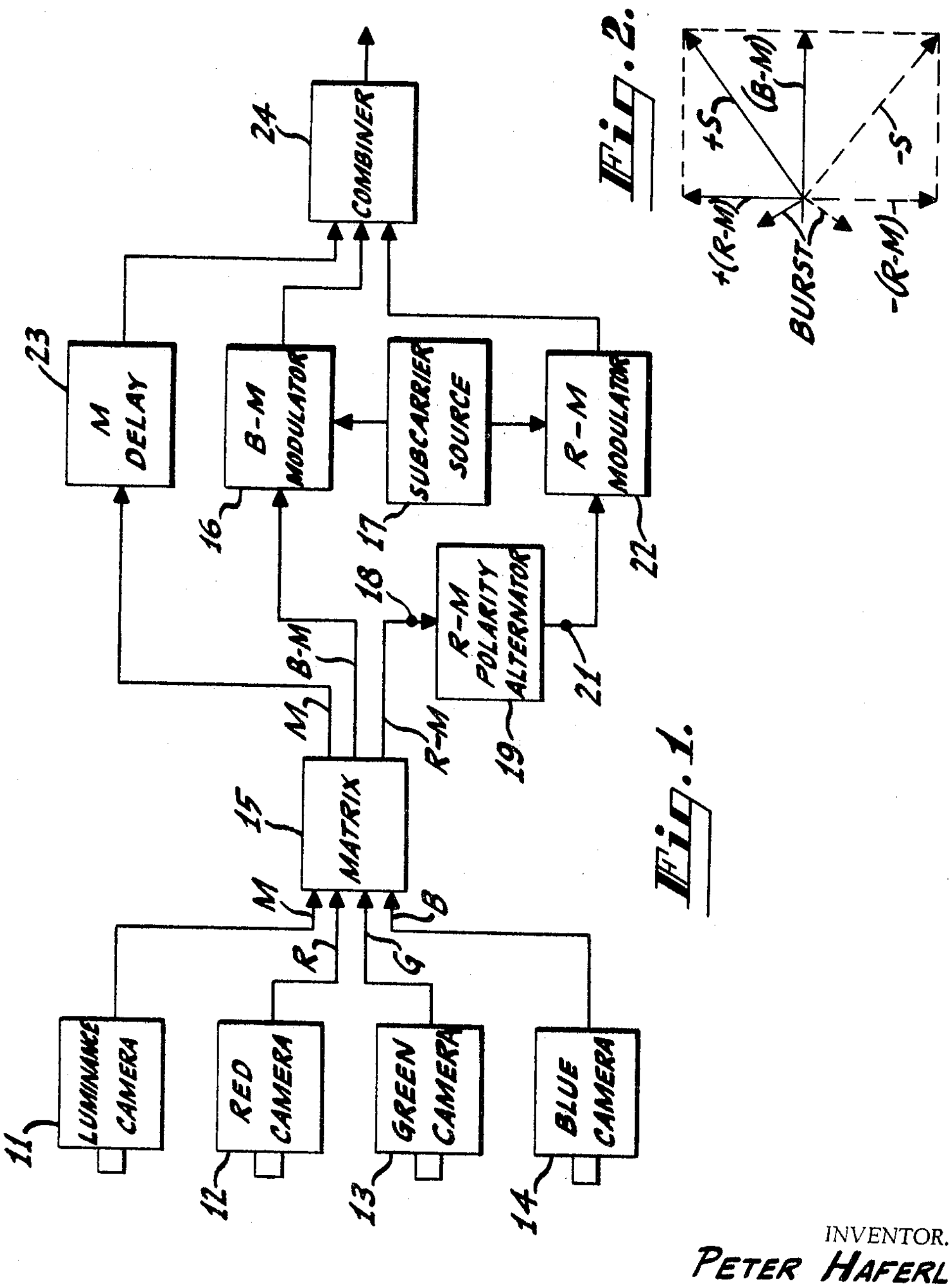
FIGURE 1 is a block diagram of apparatus for producing a color television signal suitable for use in the PAL system.
FIGURE 2 is a vector diagram showing the phase relationships of the color representative signals in one proposed form of the PAL system.

A representative form of color television system operating according to one of the PAL proposals is shown in FIGURE 1 which indicates in block form four signal pickup devices. These devices are indicated as a luminance camera 11 and red, green and blue cameras 12, 13 and 14 respectively. A luminance signal M derived from the camera 11 and the red, green and blue representative signals R, G and B, respectively derived from the color cameras 12, 13 and 14, are applied to a matrix 15. In the matrix, these signals are suitable combined with one another to produce in the output a luminance signal M which is essentially the same as the input luminance signal M and two color difference signals $(B-M)$ and $(R-M)$ representing, respectively blue and red color signals minus the luminance signal.

The blue color difference signal $(B-M)$ is applied to one input of a $(B-M)$ modulator, to the other input of which is applied a particular phase of a subcarrier wave derived from a subcarrier wave source 17. The red color difference signal $(R-M)$ derived from the matrix 15 is applied to an input terminal 18 of an $(R-M)$ polarity alternator 19. This alternator is the subject of the present invention and functions in a manner to be described to produce at its output terminal 21 a positive-going $(R-M)$ signal and a negative-going $(R-M)$ signal during alternate line scanning periods. The alternating polarities of the $(R-M)$ color difference signals are applied to one input of an $(R-M)$ modulator 22, to another input circuit of which is applied a particular phase of the subcarrier wave derived from the source 17.

The processing of the blue and red color difference signals $(B-M)$ and $(R-M)$ by the described apparatus introduces some time delay between the output circuits of the matrix 15 and the output circuits of the modulators 16 and 22. Accordingly, the luminance signal M is passed through an M delay circuit 23 so as to produce at its output circuit, a luminance signal which occurs in proper time relation to the corresponding subcarrier wave modulations by the blue and red color difference signals $(B-M)$ and $(R-M)$. The signals derived from the M delay 23 and the $(B-M)$ and $(R-M)$ modulators 16 and 22 are suitably combined in a signal combiner 24 for further processing and transmission to a receiving station.

FIGURE 2 is a vector diagram illustration of the phase relationships of the color difference signal-modulated wave derived from the modulators 16 and 22 of FIGURE 1. The $(R-M)$ and $(B-M)$ color difference signals are modulated respectively on quadrature phases of the subcarrier wave. The $(B-M)$ signal is modulated on the same phase of the subcarrier wave in successive line scanning periods. The $(R-M)$ color difference signal, however, is modulated on the subcarrier wave phase indicated by the solid line vector $+(R-M)$ during one line scanning period and on an opposite phase of the subcarrier wave during the next succeeding line scanning period as indicated by the broken line vector $-(R-M)$. Thus, during one line scanning period, a representative instantaneous resultant phase of the subcarrier wave is indicated by the solid line vector +S. During the next succeeding line scanning period, a representative instantaneous subcarrier wave phase is indicated by the broken line vector −S. In the line scanning period in which the subcarrier wave has a phase indicated by the solid line vector +S, a burst of a few cycles of the color subcarrier wave is transmitted in a phase indicated by the solid line vector at 45° to the $(B-M)$ axis. When the subcarrier wave has the phase indicated by the broken line vector −S, the burst is transmitted at a phase indicated by the broken line burst vector which also is at 45° relative to the $(B-M)$ axis in phase quadrature to the phase of the solid line burst vector.

Figure 3:
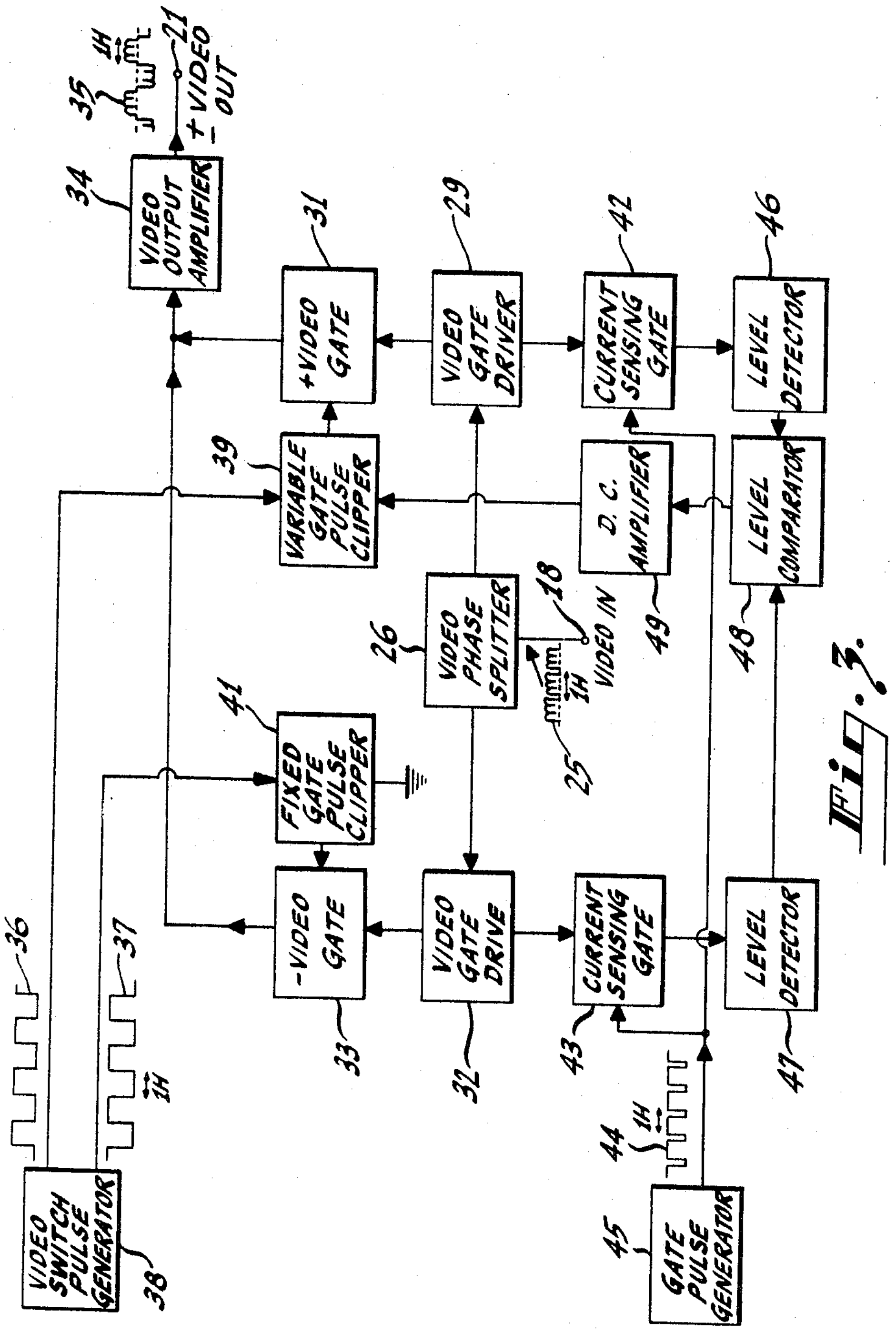
FIGURE 3 is a block diagram of apparatus embodying a form of the invention for producing a video signal of alternating polarity and of substantially constant black level.

In FIGURE 3, there is shown in block diagram form, an embodiment of the $(R-M)$ polarity alternator 19 of FIGURE 1 and embodying the present invention. The $(R-M)$ video signal 25, applied to the input terminal 18, is impressed upon a video phase splitter 26. This apparatus functions to produce in its respective output circuits opposite polarities of the $(R-M)$ video signal. One polarity of the $(R-M)$ video signal is impressed upon the input circuit of a first video gate driver 29, an output circuit of which is coupled to a first $(R-M)$ video gate 31. The other polarity of the $(R-M)$ video signal is impressed upon the input circuit of second video gate driver 32, an output circuit of which is coupled to a second $(R-M)$ video signal gate 33.

The video gates 31 and 33 are operated in alternation at the line scanning periodicity and their respective output circuits are coupled to a video output amplifier 34 so that there appears at the output terminal 21 of the video output amplifier 34 an $(R-M)$ color difference signal 35 which alternates in polarity at the line scanning periodicity.

The video gates 31 and 33 are operated in the manner described under the control of respective switch pulses 36 and 37 derived from a video switch pulse generator 38. These pulses alternate in polarity at the line scanning periodicity. They are, however, oppositely phased. The switch pulses 36 are applied through a variable gate pulse clipper 39 to the video gate 31 for its actuation during alternate scanning line periods. Similarly, the switching pulses 37 are applied through a fixed gate pulse clipper 41 to the video gate 33 to effect its actuation during line scanning periods alternating with those during which the video gate 31 is actuated.

The apparatus of FIGURE 3 also includes means for establishing substantially the same black level for the video signals of opposite polarity such as the signals 35 produced at the output terminal 21. This apparatus includes current sensing gates 42 and 43 which are rendered operative during line blanking intervals under the control of gate pulses 44 derived from a gate pulse generator 45 in order to sense the black levels of the opposite polarity video signals being passed, respectively, by the video gates 31 and 33. Coupled to the current sensing gates 32 and 33 are respective black level detectors 46 and 47. These detectors produce signals representative, respectively, of the black levels of the opposite polarity video signals derived from the video gates 31 and 33. These black level signals are impressed upon a level comparator 48 which functions to produce a control signal in its output circuit representative of any difference in the black levels of the opposite polarity video signals. This control signal is impressed upon the variable gate pulse clipper 39 through a D.C. amplifier 49 and serves as the reference potential for this pulse clipper. By such means, the video switch pulses 36 which are applied to the video gate 31 are clipped suitably to produce a $(R-M)$ video signal in the output of the gate 31 having the same black level as the $(R-M)$ video signal of opposite polarity derived from the gate 33.

Figure 4:
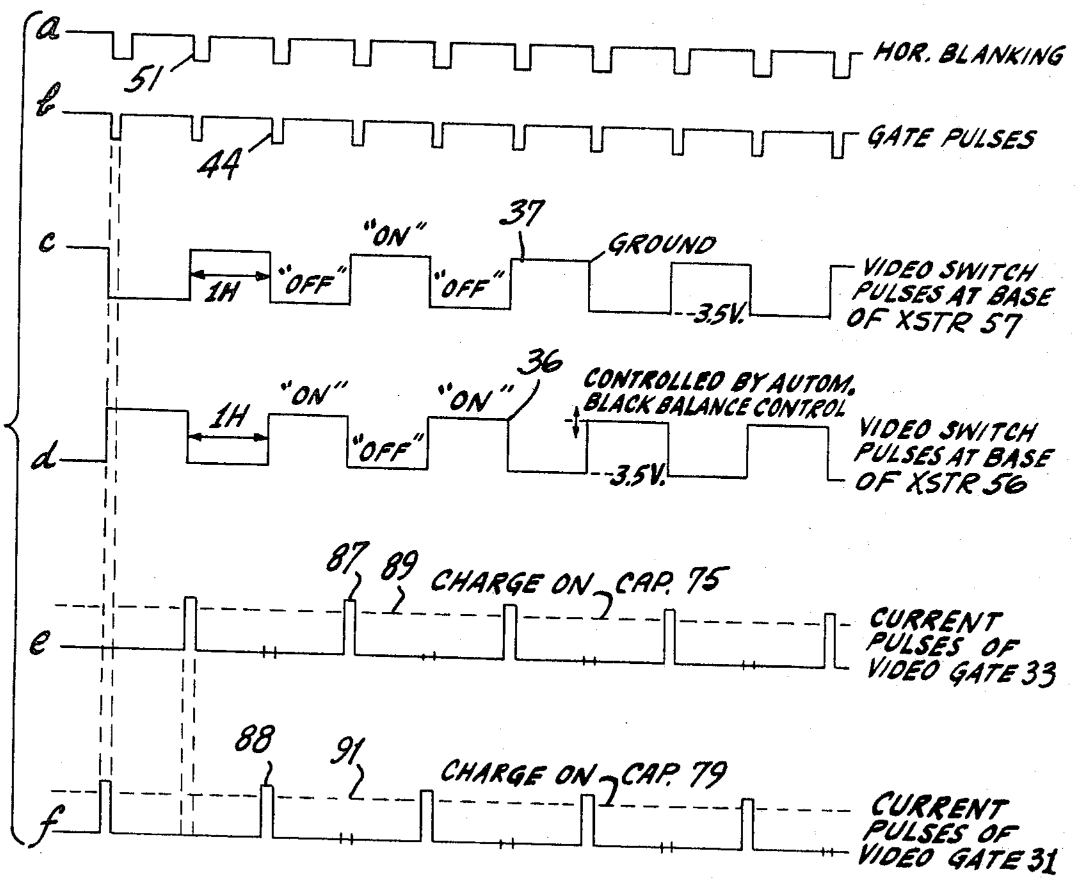
FIGURE 4 is a pulse diagram illustrative of the operation of the signalling system embodying the invention.

As may be seen by reference to the pulse diagram of FIGURE 4, the positive and negative-going excursions of the switch pulses 36 and 37 have time durations equal to the entire horizontal scanning period while the negative-going gate pulses 44 occur only during horizontal blanking intervals. The three sets of pulses may be derived, conventionally, from a series of horizontal blanking pulses 51.

The current sensing gates 42 and 43 of FIGURE 3, therefore, are rendered operative by means of the negative-going excursions of the gate pulses 44 to impress upon their respectively associated level detectors 46 and 47 currents corresponding to the video signals appearing during blanking intervals at the respective outputs of video gates 31 and 33. Such currents represent the black levels of the respective video signals of opposite polarity.

Figure 5:
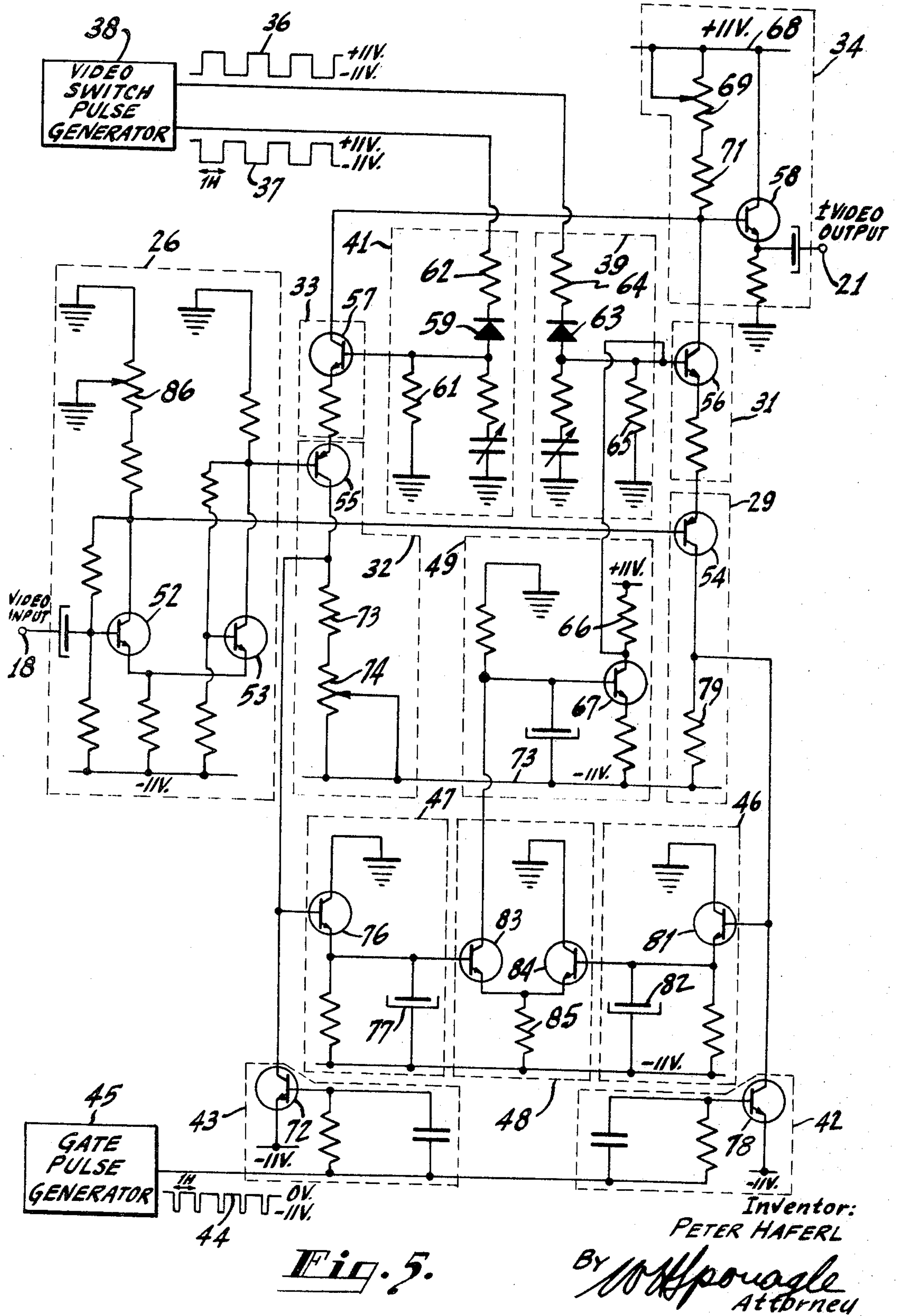
FIGURE 5 is a schematic circuit diagram of the apparatus shown in FIGURE 3 and embodying a successfully operated form of the invention.

In the schematic circuit diagram of FIGURE 5, the details of the system components of FIGURE 3 are indicated by the same reference characters as used to identify them in FIGURE 3. The phase splitter 26 comprises a pair of transistors 52 and 53 which are coupled to one another through their emitter circuits so as to produce, at their respective collector electrodes, opposite polarities of the $(R-M)$ video signal impressed upon the input terminal 18.

The opposite polarity video signals produced at the respective collector electrodes of the transistors 52 and 53 are impressed upon the base electrodes of pnp transistors 54 and 55 respectively of the video gate drivers 29 and 32. The emitter electrodes of the gate driver transistors 54 and 55 are coupled to the respective emitter electrodes of npn transistors 56 and 57 of the video gates 31 and 33, the collector electrodes of which are connected together and to the base electrode of an npn transistor 58 of the video output amplifier 34.

While the opposite polarity video signals derived from the phase splitter 26 are continuously impressed upon the transistors 54 and 55 of the gate drivers 29 and 32, respectively, the transistors 56 and 57 of the respective video gates 31 and 33 are rendered alternately conductive during successive line scanning periods as previously described. The switch pulses 37, applied to a diode 59 of the fixed gate pulse clipper 41, are clipped such that the positive-going excursions thereof are clamped to ground potential by means of the connection of the diode to ground through a resistor 61. The video gate transistor 57 thus is rendered conductive to convey the video signal from the gate driver transistor 55 to the output amplifier transistor 58. During the negative-going excursions of the switch pulses 37, the diode 59 is conducting, thereby applying a control voltage to the base of the gate transistor 57 by means of voltage divider resistors 61 and 62. This control voltage is sufficiently negative to drive the transistor into cutoff and thus prevent the video signal applied to the base of the gate driver transistor 55 from being impressed upon the transistor 58 of the output amplifier 34.

In a similar manner, negative-going excursions of the switch pulses 36, when applied to a diode 63 of the variable gate pulse clipper 39, cause the diode to conduct, thereby applying by voltage divider resistors 64 and 65, sufficiently negative voltage to the base of the transistor 56 of the video gate 31 to render it nonconducting so as to prevent the transfer of the video signal from the driver transistor 54 to the output amplifier transistor 58. Positive-going excursions of the switch pulses 36 render the diode 63 nonconducting, thereby producing a control voltage upon the base of the gate transistor 56 to render it conducting so as to effect the transfer of the video signal from the driver transistor 54 to the output amplifier transistor 58. The control voltage which is applied to the base of the gate transistor 56 is determined by a voltage divider comprising the resistor 65 in the variable gate pulse clipper 39 and a resistor 66 included in the D.C. amplifier 49. This control voltage may be at ground potential or slightly positive or negative depending upon the video signal and the conductive condition of a transistor 67 of the D.C. amplifier 49. The conductive condition of this transistor is variable and its operation will be described in greater detail subsequently.

The foregoing description of FIGURE 5 relates principally to the operation of that apparatus by means of which opposite polarities of the video signal are produced at the output terminal 21 of the polarity alternator during alternate line scanning periods. The following description concerns the apparatus by means of which the opposite polarity video signals produced at the output terminal 21 are processed to have substantially the same black levels.

When the gate transistor 57 is rendered conducting in the manner described, it closes a circuit for the flow of current from a +11 volt bus 68, shown in relation to the output amplifier 34, through a potentiometer 69, a resistor 71, transistors 57, 55, and a transistor 72 of the current sensing gate 43. This latter transistor is in a saturated conducting state during the active line scanning period by reason of the impression upon its base electrode of the positive-going excursions of the gate pulses 44. During line blanking intervals, the negative-going excursions of the gate pulses 44 drive the current sensing gate transistor 72 to cutoff, thereby causing the current flowing through transistors 57 and 55 to flow through a resistor 73 and a potentiometer 74 to the −11 volt bus 75, shown in relation to the video gate driver 32 and the D.C. amplifier 49. The voltage drop across the resistor 73 and potentiometer 74, when applied to the base electrode of a transistor 76 of the level detector 47, causes this transistor to conduct, whereby a capacitor 77 becomes charged to a voltage corresponding to the black level current of the video signal being transferred by the gate 33 to the output amplifier 34 at that time. At the termination of the negative-going excursion of the gate pulse 44, the current sensing gate transistor 72 is again driven into saturation, thereby effectively short circuiting the resistor 73 and the potentiometer 74 of the gate driver 32 and thus driving the level detector transistor 76 to cutoff. This condition of the transistor 76 is maintained by the charge on the capacitor 77 until the current sensing gate transistor 72 is again rendered non-conducting.

In a similar manner, when the gate transistor 56 is rendered conducting to transfer the video signal from the gate driver transistor 54 to the output amplifier transistor 58, the circuit from the +11 volt bus 68 of the amplifier 34 is completed through a transistor 78 of the current sensing gate 42 during the trace interval of a line scanning period. During the retrace interval, a negative-going excursion of one of the gate pulses 44 drives the transistor 78 to cutoff, thereby causing the video signal current to flow through a resistor 79 of the video gate driver 29. The voltage produced across the resistor 79, due to the flow therethrough of the video signal black level current, renders a transistor 81 of the level detector 46 conductive to a degree corresponding to the voltage across the resistor 79. By this means, a capacitor 82 is charged to a voltage corresponding to the black level current of the video signal being transferred through the gate 31 to the output amplifier 34. The subsequent impression of a positive-going excursion of the pulse 44 upon the sensing gate transistor 78 again drives it into saturation thereby effectively short-circuiting the resistor 79 of the gate driver 29 and driving the level detector transistor 81 to cutoff. This transistor is maintained cutoff until the current sensing gate transistor 78 is again rendered nonconducting.

The voltages to which the respective capacitors 77 and 82 of the level detectors 47 and 46 are charged by the opposite polarity video signals are impressed respectively upon the base electrodes of transistors 83 and 84 of the level comparator 48. These transistors are emitter-coupled through a resistor 85 so that the voltage developed at the collector electrode of the transistor 83 represents the difference in the charges of the level detector capacitors 77 and 82, which in turn represent the black levels of the opposite polarity video signals. This voltage, when applied to the base of the transistor 67 of the D.C. amplifier 49, renders this transistor more or less conductive, thereby altering the voltage at the junction of the voltage divider resistors 65 and 66 respectively of the variable gate pulse clipper 39 and the D.C. amplifier 49. As previously explained, this voltage divider voltage determines the clipping level of the switch pulses 36 effected by the diode 63.

An adjustment of the potentiometer 74 of the video gate driver 32 enables the control of the charge placed in the capacitor 77 and thereby enables the production of an optimum black balance of the alternating polarity video signal produced at the output terminal 21. A potentiometer 86 in the collector circuit of the transistor 52 of the phase splitter 26 enables the relative gain of the opposite polarity signals derived from signals 52 and 53 to be adjusted so as to equalize the amplitudes of the signals. The potentiometer 69 in the output amplifier 34, provides an overall gain control for the alternating polarity video signal produced at the output terminal 21.

The pulses 87 and 88 of FIGURES *4e* and *4f* respectively represent the pulses of current applied to the capacitors 77 and 82 during alternate blanking intervals. The broken lines 89 and 91 of FIGURES *4e* and *4f* respectively, represent the voltage levels to which the capacitors 77 and 82 become charged by the current pulses 87 and 88.

What is claimed is:

1. A signalling system for producing a video signal of constant black level and alternating in polarity at a given periodicity, comprising:

first and second video signal gate circuits;

means supplying first and second opposite polarities of a video signal respectively to said first and second gate circuits;

a video signal output circuit;

switching means operative at said given periodicity to couple said video signal gate circuits alternately to said output circuit;

first black level setting means coupled to said first video signal gate circuit to establish the black level of said first polarity video signal relative to a fixed reference potential; and second black level setting means coupled to said second gate circuit to establish the black level of said second polarity video signal relative to the black level of said first polarity video signal.

2. A signalling system as defined in claim 1, wherein:

said video signal supplying means includes a phase splitter having an input circuit and two output circuits;

means impressing said video signal upon said input circuit; and means deriving said first and second opposite polarities of said video signal respectively from said two output circuits.

3. A signalling system as defined in claim 2, wherein:

said switching means includes a source of first and second series of switch pulses at said given periodicity and of respectively opposite phases;

means including said first black level setting means to impress said first series of switch pulses upon said first gate circuit to render said first gate circuit operative; and means including said second black level setting means to impress said second series of switch pulses upon said second gate circuit to render said second gate circuit operative in alternation with the operation of said first gate circuit.

4. A signalling system as defined in claim 3 wherein:

said first black level setting means includes a first clipper having;

an input circuit coupled to said pulse source to receive said first series of switch pulses;

an output circuit coupled to said first gate circuit to render said first gate circuit operative; and a reference circuit coupled to a point of fixed potential to establish the black level of said first polarity video signal.

5. A signalling system as defined in claim 4, wherein:

said second black level setting means includes black level comparator means having;

a first input circuit coupled to said first video signal gate;
a second input circuit coupled to said second video signal gate; and
an output circuit in which to develop a variable reference signal representative of any difference in the respective black levels of said first and second polarity video signals.

6. A signalling system as defined in claim 5, wherein: said second black level setting means also includes a second clipper having;
an input circuit coupled to said pulse source to receive said second series of switch pulses;
an output circuit coupled to said second gate circuit to render said second gate circuit operative; and
a reference circuit coupled to the output circuit of said black level comparator to establish the black level of said second polarity video signal so as to match the black level of said first polarity video signal.

7. A signalling system as defined in claim 6, wherein: said respective first and second input circuits of said black level comparator means include first and second black level detectors responsive respectively to said first and second polarity video signals during blanking intervals.

8. A signalling system as defined in claim 7, wherein: said respective first and second input circuits of said black level comparator means also include first and second current sensing gates coupled respectively to said first and second video signal gates and to said respective first and second black level detectors; and
means to periodically actuate said first and second sensing gates to impress the respective black level components of said first and second polarity video signals in the respective output circuits of said first and second video signal gates respectively upon said first and second black level detectors.

9. A signalling system as defined in claim 8, wherein: said periodic actuating means includes a source of gate pulses having said given periodicity and occurring only during the blanking intervals of said video signals.

References Cited

UNITED STATES PATENTS 3,146,302 8/1964 Moore ------------- 178—5.4

ROBERT L. GRIFFIN, *Primary Examiner.*

R. L. RICHARDSON, *Assistant Examiner.*